US006554754B2

(12) United States Patent
VanRens (10) Patent No.: US 6,554,754 B2
(45) Date of Patent: Apr. 29, 2003

(54) "SMART" BOWED ROLL (75) Inventor: Mark R. VanRens, DePere, WI (US)

(73) Assignee: Appleton International, Inc., Kimberly, WI (US)

( * ) Notice: Subject to any disclaimer, the term of this patent is extended or adjusted under 35 U.S.C. 154(b) by 36 days.

(21) Appl. No.: 09/894,246

(22) Filed: Jun. 27, 2001

(65) Prior Publication Data

US 2002/0016241 A1 Feb. 7, 2002

Related U.S. Application Data (60) Provisional application No. 60/214,571, filed on Jun. 28, 2000.

(51) Int. Cl.[7] ............................................... B23P 15/00
(52) U.S. Cl. ............................ 492/10; 492/9; 492/39; 492/40; 26/99; 26/101; 226/190
(58) Field of Search .................. 492/9, 10, 39, 492/40; 26/99, 101; 226/168, 174, 179, 187, 190, 191; 73/649, 660, 658, 488

(56) References Cited

U.S. PATENT DOCUMENTS

| 3,645,433 A | * | 2/1972 | Lucas et al. ................. 226/190 |
| 4,233,011 A | * | 11/1980 | Bolender et al. ............ 425/143 |
| 4,404,906 A | * | 9/1983 | Curran ........................ 101/211 |
| 4,830,302 A | * | 5/1989 | Hawkins .................. 242/541.1 |
| 4,832,274 A | * | 5/1989 | Hawkins .................. 242/541.1 |
| 4,832,302 A | * | 5/1989 | Anderson et al. ........... 248/443 |
| 4,862,565 A | * | 9/1989 | Damour ......................... 26/99 |
| 5,273,197 A | * | 12/1993 | Wenk ........................... 226/190 |
| 5,411,463 A | | 5/1995 | Brookstein ................... 492/38 |
| 5,522,203 A | * | 6/1996 | Lancaster et al. ............. 53/441 |
| 5,522,785 A | * | 6/1996 | Kedl et al. ..................... 492/21 |
| 5,702,045 A | * | 12/1997 | Tschirner .................... 226/191 |
| 5,727,753 A | * | 3/1998 | Harris ....................... 242/615.1 |
| 5,729,878 A | * | 3/1998 | Kurihara et al. ............... 26/101 |
| 5,752,443 A | | 5/1998 | Dawley ........................ 101/216 |
| 5,760,995 A | * | 6/1998 | Heller et al. ................... 360/92 |
| 6,044,553 A | | 4/2000 | Thormann et al. ......... 29/889.21 |
| 6,116,159 A | * | 9/2000 | Koyama ..................... 101/228 |
| 6,471,829 B2 | * | 10/2002 | Frawley et al. ............. 162/352 |

OTHER PUBLICATIONS

Roisum, David. R., *The Mechanics of Rollers,* TAPPI Press, pp. 204–206 (199_).

Appleton International, Inc., *Bowed Rolls (Bowed Rolls Precision; Bowed Roll Rubber Cover Options)*, 3 pages (199_).

Appleton International, Inc., *Appleton International Inc. (Size Press, Winder, Calender and Reel; Precision Spreading, The Draw, Web Control; specifications)*, 4 pages (199_).

Appleton International, Inc., *Overview (The Bowed Roll, Roll Styles, Reinforced Rolls, Hydraulic Adjustable Roll, Metal Covered or Steel Rolls, Metal Coatings for Special Applications, Roll Covers, Vented–Grooved Covers, Hard Ends, Mounting Brackets, Roll Handling, Roll Storage)* 14 pages (199_).

* cited by examiner

*Primary Examiner*—I Cuda-Rosenbaum
(74) *Attorney, Agent, or Firm*—Whyte Hirschboeck Dudek SC (57) ABSTRACT

An improved bowed roll assembly and system that can be adjusted during operation to alter critical speeds to outside the range of the operational speed of the assembly, and methods of altering critical speeds of the roll assembly during its operation to inhibit harmonic vibration are provided. In one embodiment, the bowed roll assembly system includes a programmable logic controller (PLC) and accelerometer, and the critical speeds of the roll assembly are "learned" by the PLC which triggers changes to the pressure of the pressure applying member of the assembly to alter the roll's stiffness and the critical speeds.

40 Claims, 10 Drawing Sheets

Prior Art

"SMART" BOWED ROLL

CROSS-REFERENCED TO RELATED APPLICATIONS

This application claims the benefit of U.S. provisional application Serial No. 60/214,571, filed Jun. 28, 2000.

FIELD OF THE INVENTION

The present invention relates generally to bowed roll assemblies, and more particularly to an apparatus and system for adjusting a bowed roll assembly to alter critical speeds and inhibit harmonic vibration during operation of the assembly.

BACKGROUND OF THE INVENTION

A bowed roll is a banana shaped, rubber covered or segmented metal roller used to remove wrinkles in a continuously moving web of media such as paper, foil, plastic film or the like. The bowed roll is comprised of a series of rotating segments (or spools), fitted with bearings, along a curved stationary axle.

The bowed roll is normally installed with the bow oriented more or less in the downstream direction. Under this condition, the incoming web contacts the roll surface on the backside of the bow. The web then remains in contact with the roll surface for 25-to-35 degrees of rotation before separating from the roll surface on the front-side of the bow. Since the roll is bowed, it stands to reason that the face width of the roll (measured along the roll's surface) increases gradually from the back-side to the front-side. It is this "widening" of the roll face that induces lateral tension (or stretch) in the web while it is in contact with the roll surface to reduce or remove wrinkles.

Figure 1:
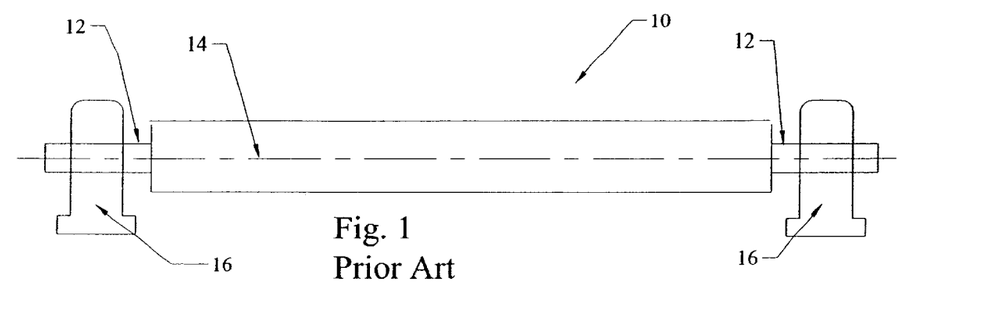
FIG. 1 is an illustration of a bowed roll assembly according to the prior art showing a self-aligning bracket on either end.
Figure 3:
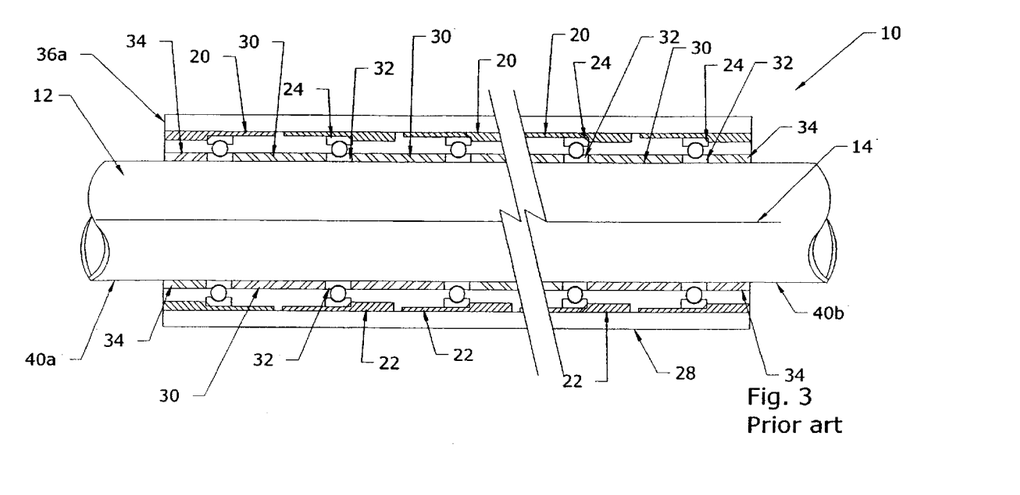
FIG. 3 is a partial elevational cross-sectional view of an embodiment of a standard bowed roll construction of the assembly shown in FIG. 1.

An example of a prior art bowed roll assembly 10 is depicted in FIG. 1. The bowed roll is comprised of a series of rotating segments or spools along a curved stationary axle (FIG. 3). The individual spools, each supported by a bearing centered within the spool, are placed along the axle and spaced so they turn freely yet in unison with each other. Referring to FIG. 1, the bowed roll includes a central axle 12 and a centerline 14, and is typically supported on each end with self-aligning mounting brackets 16. The position of the bow is adjusted by rotating the axle 12 in the self-aligning brackets 16. By changing the bow position, the amount of lateral stretch or tension in either the center or edges of the web can be controlled. In addition, the lateral tension induced by the bowed roll can also be used to aid in separating a single web which has been slit in two or more webs to prevent interweaving during winding operations or the like. Bowed rolls find numerous applications above and beyond the examples cited here.

At predictable rotational speeds, bowed rolls (as is the case with all rotating machinery) are subject to a multitude of harmonic vibration modes, which can occur during normal operation depending upon the construction of the roll, the materials used in its construction, and the process speed. The speeds at which the phenomenon of harmonic vibration occurs is often referred to as the "whirling" or "critical" speeds. The critical speed of a roll is essentially the rotational speed equivalent to the roll's natural frequency of vibration. If a roll is operating at these speeds, oscillations may occur that can damage a forming sheet, among other things. This phenomenon is well known to those engaged in the design of shafts, rollers and other rotating machinery.

Figure 2A:
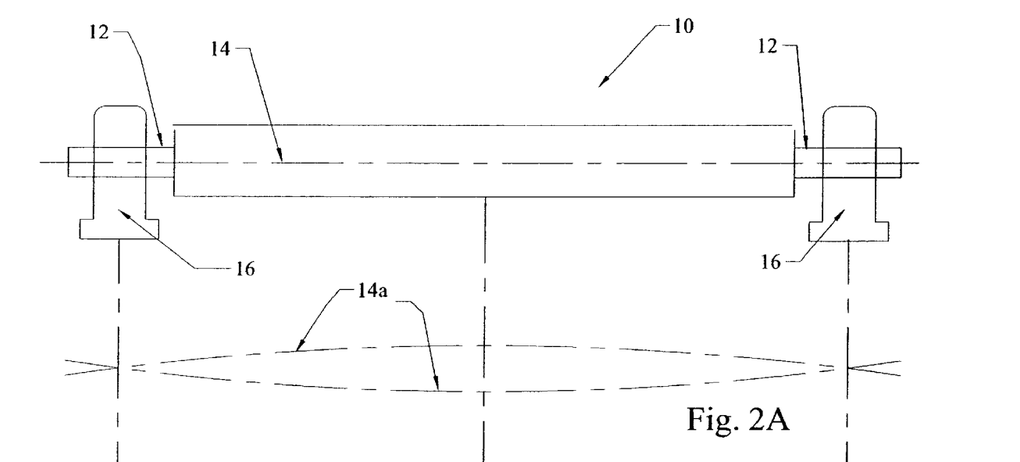
FIGS. 2A–2C illustrate typical vibration mode shapes for the bowed roll of FIG. 1 operating at A) first, B) second, and C) third critical speeds.
Figure 2B:
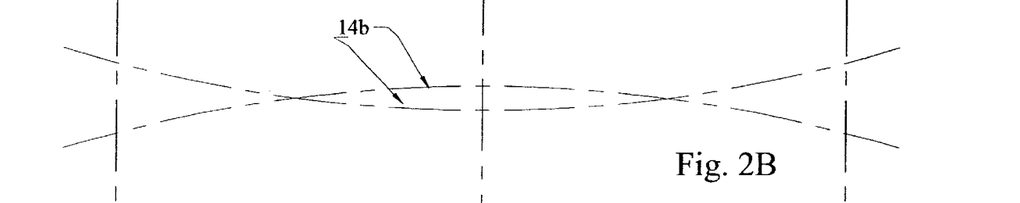
Figure 2C:
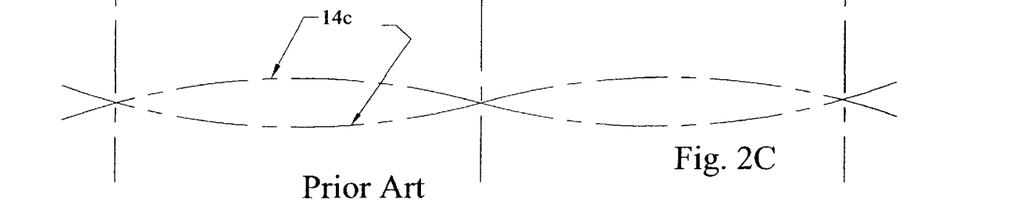

The first three critical speeds ("criticals") are of great significance in that their related amplitudes of oscillation are great enough to either disturb the web handling process and/or result in damage to the spool bearing raceways and rolling elements. FIGS. 2A–2C illustrate the harmonic vibration mode shapes for a bowed roll centerline when operating at the first three critical speeds, and show the dynamic shape of the bowed roll centerline 14a, 14b, 14c at the first, second and third critical speeds, respectively. Bowed rolls have been proven to experience premature spool bearing failures when the roll is operated at these criticals for significant periods of time.

Referring to FIG. 3, an embodiment of a prior art bowed roll construction is shown. In the current state of the art/science of bowed roll construction, a series of spool assemblies 20 comprising a rotating segment (or spool) 22 fitted with bearings 24, are positioned along a curved stationary axle 12. These spool assemblies 20 are positioned so as to be in near proximity to each other and are coupled together individually by means of elastomer couplings 28. In the case of rubber-cover rolls, an elastomer covering or sleeve 28 (as shown) is fitted over the entire series of spool assemblies.

As depicted, the spool assemblies 20 are held in near proximity by means of annular spacers 30, which are fitted over the curved axle 12 (with the axle having an annular cross section) with their ends abutting the inner races 32 of the spool bearings 24. The entire series of spool assemblies 20 and spacers 30 are held in position along the bowed roll axle 12 by means of set collars 34 affixed to the axle 12 at either end 40a,b of the assembly 10.

Figure 4:
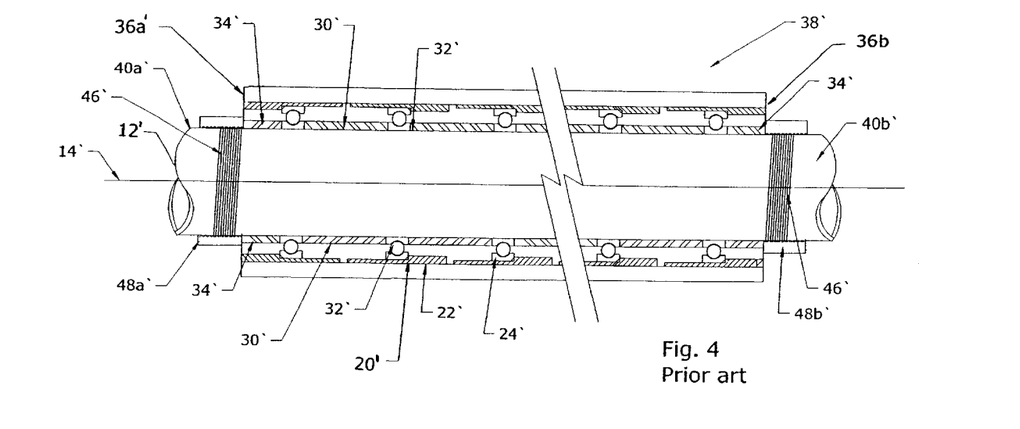
FIG. 4 is a partial elevational cross-sectional view of an embodiment of a conventional reinforced bowed roll construction of the assembly shown in FIG. 1.
Figure 5:
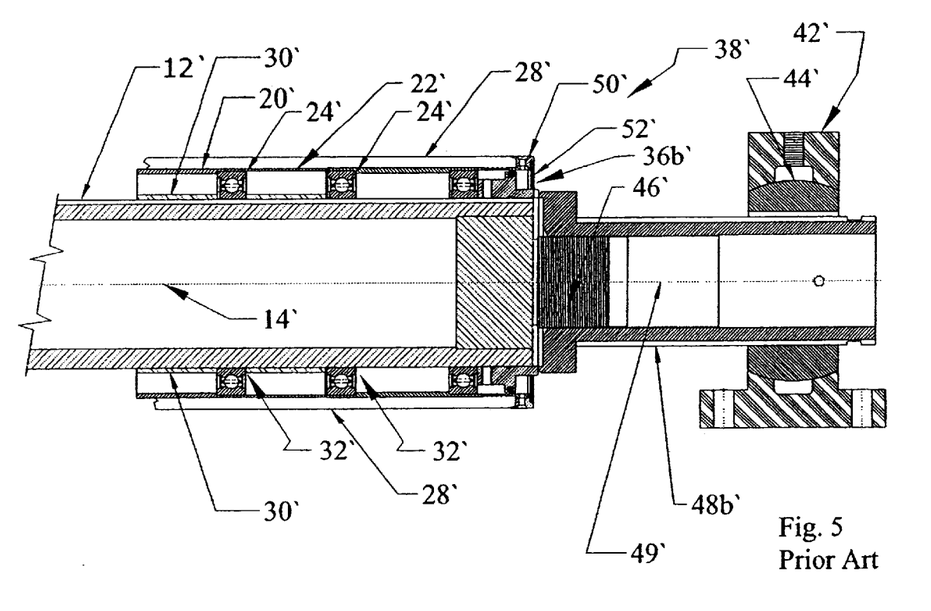
FIG. 5 is an elevational, cross-sectional view of the bowed roll shown in FIG. 4, illustrating a mounting bracket at one end of the assembly.

In another embodiment of a bowed roll assembly, designated generally with the numeral 38' and shown in FIGS. 4 and 5, the ends 40a', 40b' of the axle 12' comprise threads 46' to which large reinforcing nuts 48a', 48b' are affixed to the axle ends. Each end 40a', 40b' of the axle 12' is mounted in a roll supporting bracket 42' that includes a ball clamp 44'. In this instance, a predetermined torque is applied to the nuts, which in turn loads the spool bearing inner races 32' and annular spacers 30' in compression, which induces an amount of tension in the axle and increases the stiffness of the roll. In the manufacture of bowed rolls, this technique is referred to as "reinforcing," and the assembly 38' can be referred to as a reinforced bowed roll assembly. A reinforced roll is similar to a standard bowed roll (FIG. 3) except with a reinforced axle. As shown in FIG. 5, the ends 36a', 36b' of the assembly 38' include an end cap 50' and an end shield 52'.

It is well known to those versed in the art/science of rotating machinery that the critical speeds for rollers, shafts, and the like, occur as a function of the roller's mass and stiffness. The step of reinforcing a bowed roll increases the roll's stiffness, which in turn alters the rotational speeds at which the roll's "criticals" occur. By changing the torque applied to the axle nuts 48', one can tune (i.e., increase, decrease, shift) the criticals to speeds out of the range of the operating speed of the bowed roll assembly so the criticals will not be encountered during normal operation for a known process machine speed. However, the adjustment of the applied torque requires that the roll be taken out of service and partially disassembled. Hence, it is not practical to perform this procedure in the field. While the ability to tune the criticals for a roll is helpful in preventing harmonic vibration, it requires that the machine process speed be limited. This is often unacceptable in that it may limit the machine's productivity.

SUMMARY OF THE INVENTION

The present invention provides an improved bowed roll assembly for use in machines for processing paper and other continuous web of flexible media, among other applications.

In one aspect, the invention provides a bowed roll assembly that can be adjusted during operation of the assembly to alter critical speeds to outside the range of the operational speed of the assembly. The bowed roll assembly generally comprises a non-rotating central axle having a first end and a second end, at least two tubular segments, each supported on a rolling bearing and rotatably mounted on the central axle, and a plurality of annular spaces mounted on the axle between the roller bearings to maintain the tubular segments in near proximity.

In one embodiment of a bowed roll assembly, the first end of the axle comprises a member mounted thereon for applying or loading pressure against the bearings and the spacers which can be varied to compress and uncompress the tubular segments along the axle and alter the stiffness of the roll assembly, and the roll assembly is connected to a member for detecting speed of the roll assembly and sending a signal of the speed to a signal processing device. When the speed of the roll assembly approaches a critical speed, the signal processing device sends a signal to the pressure applying member to vary the pressure against the bearings and spacers to sufficiently stiffen or unstiffen the roll assembly to inhibit harmonic vibration of the roll assembly and shift the critical speeds out of the range of the operating speed of the bowed roll assembly so the criticals will not be encountered during normal operation for a known process machine speed.

In another embodiment of the roll assembly, the signal processing device can be pre-programmed with critical speed values of the bowed roll assembly. When the signal processing device receives a signal of the rotational speed of the bowed roll assembly at or near a critical speed value, the signal processing device sends a signal to the pressure applying member to increase or decrease the pressure against the spacers to sufficiently stiffen or unstiffen (relax) the roll assembly to inhibit harmonic vibration of the roll assembly.

In another embodiment of the roll assembly, the assembly can comprise an accelerometer mounted on the roll assembly. During rotation of the roll assembly, an increase in the voltage output of the accelerometer relative to a voltage output set value indicates the rotational speed of the bowed roll assembly is at or near the critical speed value. Once the pressure of the pressure applying member has been adjusted, a decrease in the accelerometer voltage output relative to the voltage set value indicates an increase or decrease of the critical speed value.

In yet another embodiment of the roll assembly, the signal processing device comprises a programmable logic controller (PLC) functional for receiving and recording data of the accelerometer voltage output, the rotational speed of the roll assembly, and/or the pressure load applied by the pressure applying member. This enables the PLC to "learn" the critical speeds of the roll assembly associated with any given hydraulic pressure set point. When the rotational speed of the assembly approaches that critical, the PLC signals for a change in the pressure of the pressure applying member to stiffen or unstiffen the assembly and alter the critical outside the range of the operational speed.

In another aspect, the invention provides a system for altering stiffness of a bowed roll assembly. The system comprises a bowed roll assembly comprising at least two spool assemblies mounted on an axle and held in near proximity by adjacently mounted annular spacers, a member for applying pressure against (compress or uncompress) the spacers and the spool assemblies to increase or decrease the stiffness of the bowed roll assembly that is mounted on one end of the axle, and a programmable logic controller (PLC) connected to the bowed roll assembly for receiving signals therefrom and connected to the pressure applying member such as a hydraulic ram, for transmitting signals thereto. The PLC can be connected to a mechanism for measuring a machine speed reference signal. In one embodiment, the PLC can comprise a microprocessor that is pre-programmed with critical speeds of the bowed roll assembly. The PLC is functional to send signals to the pressure applying member to alter the pressure load on the spacers/spool assemblies upon sensing a rotational speed at or near a pre-programmed critical speed value. In another embodiment, the system can comprise an accelerometer mounted within the axle of the bowed roll assembly that is connected to the PLC. Voltage output data of the accelerometer can be sent to the PLC to indicate the rotational speed of the bowed roll assembly relative to a critical speed value.

In another aspect, the invention provides methods of altering critical speeds of the roll assembly during operation to inhibit harmonic vibration. The bowed roll assembly generally comprises at least two spool assemblies mounted on an axle and held in near proximity by adjacently mounted annular spacers, and a member for applying pressure against the spacers to alter stiffness of the bowed roll assembly.

In an embodiment of a method according to the invention, rotational speed of the bowed roll assembly is measured, the rotational speed is compared to a pre-programmed critical speed value, and upon sensing the rotational speed at or about the pre-programmed critical speed, the pressure of a pressure applying member against the spacers is altered to increase or decrease the stiffness of the bowed roll assembly and alter the critical speed to a range outside of the roll rotational speed. The method can further comprise the step of pre-programming critical speeds into a PLC connected to the assembly.

In another embodiment of the method, the bowed roll assembly further comprises an accelerometer mounted on the roll assembly, and the method comprises the steps of measuring rotational speed of the roll assembly, measuring (and recording) voltage output of the accelerometer, and determining whether the rotational speed of the roll assembly is at or near a critical speed based on the voltage output of the accelerometer. When the rotational speed is at or near a critical speed, the pressure of the pressure applying member against the spacers is altered to increase or decrease the stiffness of the roll to alter the critical speed to a range outside of the roll rotational speed. The method can further include measuring the voltage output of the accelerometer to determine whether the critical speed has been so altered. A decrease in voltage output of the accelerometer indicates an increase or decrease in the critical speed.

In another embodiment of the method, wherein the bowed roll assembly further comprises an accelerometer mounted on the roll assembly, the method comprises the steps of measuring voltage output of the accelerometer to determine whether the rotational speed is at or near a critical speed value, wherein an accelerometer signal voltage higher than set voltage output value indicates the rotational speed to be at or about the critical speed; and upon sensing the rotational speed at or about the critical speed, increasing or decreasing the pressure of the pressure applying member against the spacers to alter the stiffness of the roll and the critical speed value to a range outside of the rotational speed of the roll. The method can further include measuring the voltage output of the accelerometer to determine whether the critical speed has been altered, as indicated by a decrease in the accelerometer voltage output which indicates an increase or decrease in the critical speed.

In yet another embodiment of the method, the bowed roll assembly includes a PLC and accelerometer, and the critical speeds of the roll assembly are "learned" by the PLC which triggers changes to the pressure of the pressure applying member of the assembly to alter the roll's stiffness and the critical speeds. The method comprises measuring the rotational speed of the roll assembly; measuring the voltage output of the accelerometer; determining if the voltage output of the accelerometer exceeds a set value whereby the rotational speed is at or about a critical speed value; when the accelerometer voltage output exceeds the set value, recording the voltage output and the rotational speed by the PLC as a value to indicate a critical speed; when the rotational speed is at or about a critical speed, altering the pressure of the pressure applying member against the spacers to alter the critical speed to a range outside of the rotational speed of the roll. The method further comprises measuring the voltage output of the accelerometer and the rotational speed of the roll during the continued operation of the assembly whereupon, when the voltage output and rotational speed reach the critical speed value that has been recorded by the PLC, altering the pressure of the pressure applying member to alter the critical speed outside the range of the rotational speed of the roll. The accelerometers mounted inside the bowed roll can then be used to verify that the critical speed has been altered according to a decrease in the voltage output level.

BRIEF DESCRIPTION OF THE DRAWINGS

Preferred embodiments of the invention are described below with reference to the following accompanying drawings, which are for illustrative purposes only. Throughout the following views, the reference numerals will be used in the drawings, and the same reference numerals will be used throughout the several views and in the description to indicate same or like parts.

DESCRIPTION OF THE INVENTION

The invention will be described generally with reference to the drawings for the purpose of illustrating the present preferred embodiments only and not for purposes of limiting the same.

Figure 6:
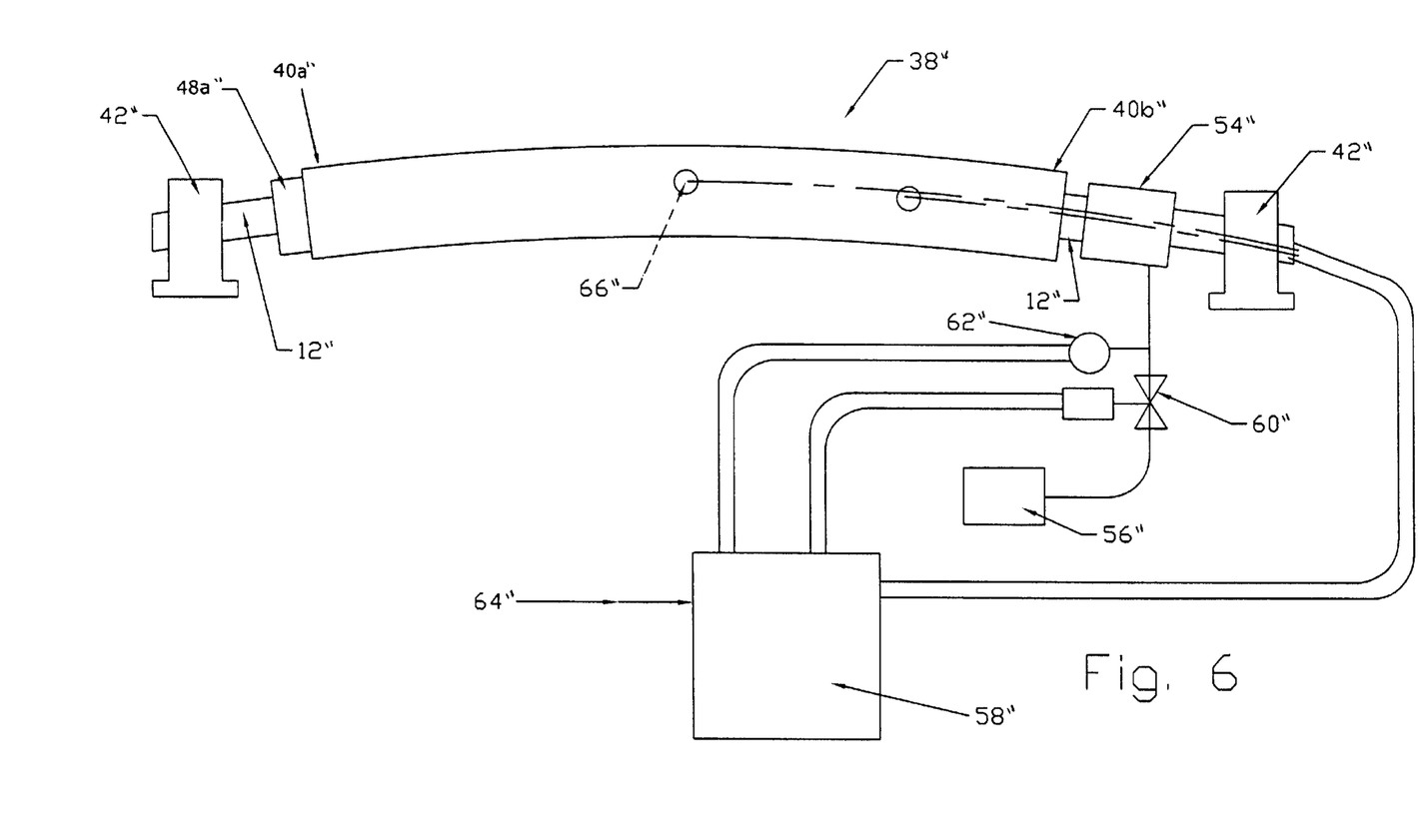
FIG. 6 is an illustration of an embodiment of a "smart" bowed roll and control system according to the invention.
Figure 7:
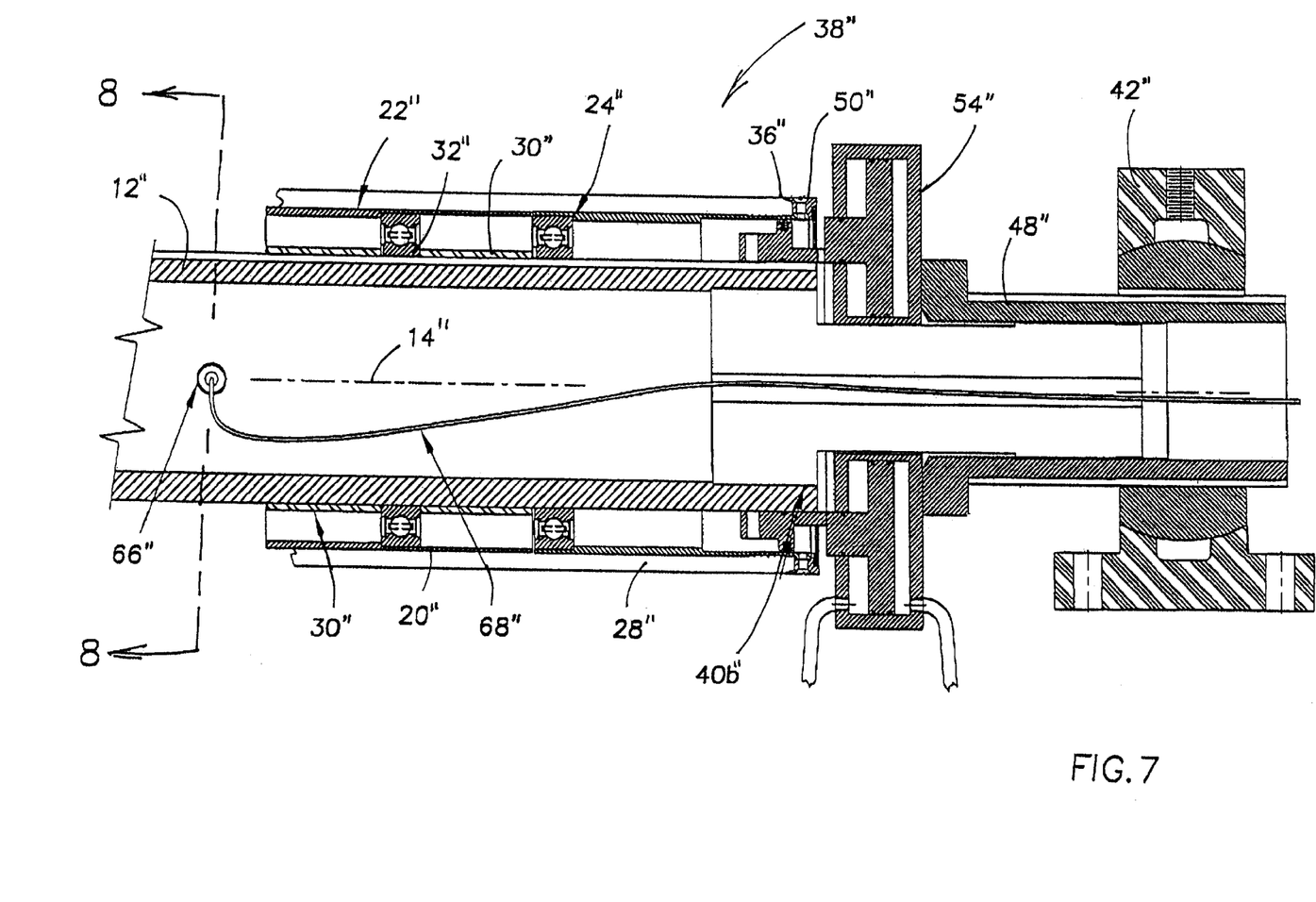
FIG. 7 is an elevational, cross-sectional view of the bowed roll of FIG. 6 showing the mounting of the hydraulic ram, mounting bracket, accelerometer, and lead.
Figure 8:
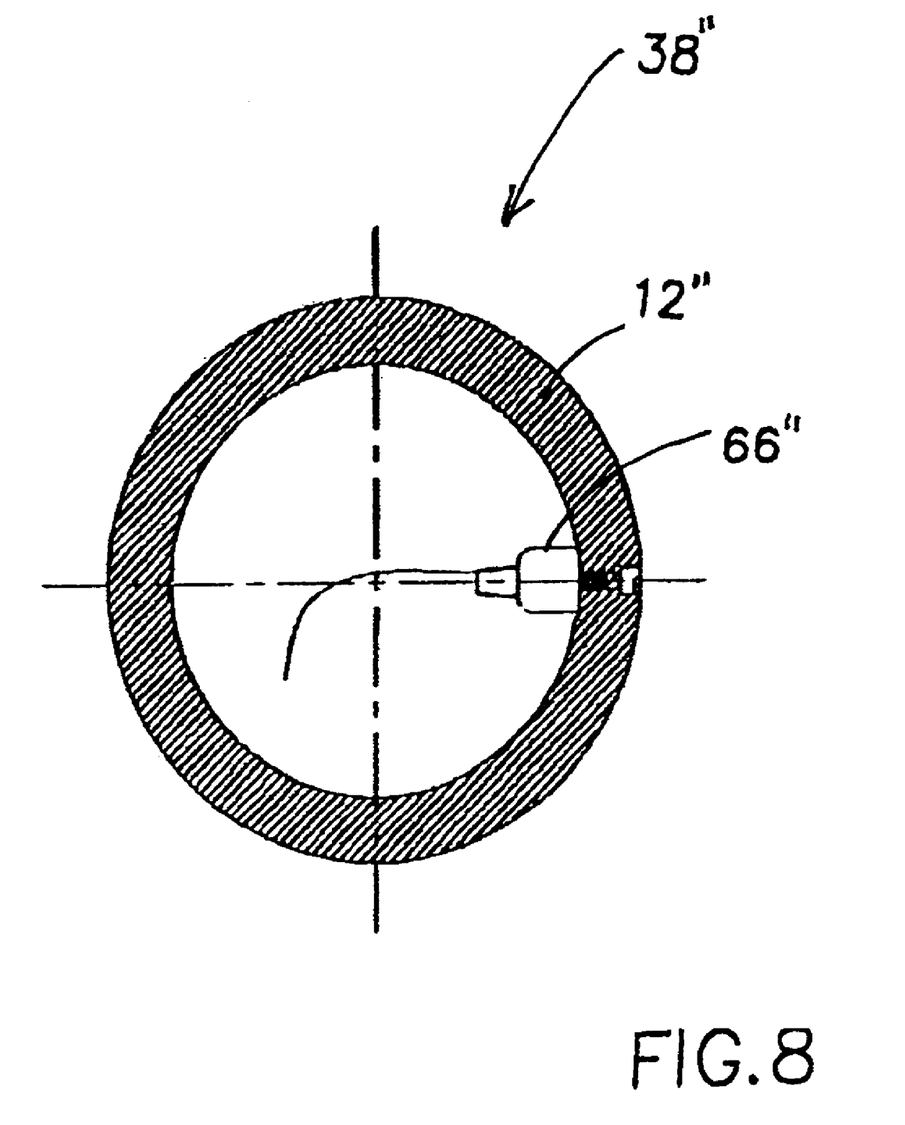
FIG. 8 is a cross-sectional view of the bowed roll axle of FIG. 7 taken along lines 8—8, and showing the mounting orientation of the accelerometer in the interior of the axle of the assembly.

An embodiment of a bowed roll assembly according to the invention is illustrated and described with reference to FIGS. 6–12. The bowed roll assembly comprises a reinforced bow roll construction 38" similar to that shown in FIG. 4. As shown in FIGS. 6 and 7, one of the reinforcing axle nuts (shown as 48b' in FIG. 5) at one end 40b" of the reinforced bowed roll 38" is replaced with a pressure applying member 54" in the form of a hydraulic ram, which is affixed to the central axle 12" and connected to a suitable hydraulic pump 56" (FIG. 6). The reinforcing nut 48a" on the opposing end 40a" of the axle 12" is fixed in place or replaced by a shoulder (not shown) against which the annual spacers 30" and spool bearing assemblies 20" may bear, as depicted in FIGS. 4 and 5. By varying the pressure applied to the hydraulic ram 54", which loads (applies pressure) against the annular spacer 30", the pressure that is applied can be increased or decreased and the stiffness of the roll 38" can be altered at any time during the operation and without stopping the assembly.

As shown in FIG. 6, a programmable logic controller (PLC) 58" comprising a microprocessor and appropriate software is utilized in conjunction with an electronically actuated hydraulic control valve 60", a pressure-to-current (P-I) transducer 62", a machine speed reference signal 64", which signal is proportional to the value of the current rotational speed of the bowed roll assembly (for example, an electrical reference signal of about 4 mA to about 20 mA used to control the machine drive speed, and which corresponds to a minimal speed value (e.g., 0 rpm) to a set maximal speed value (e.g., 3,000 rpm), and two accelerometers 66" (typically producing an electrical signal of about 0 mV to about 10 mV proportional to vibration amplitude) mounted inside the bowed roll annular axle 12" accelerometers 66" are positioned at about one quarter to one half the distance between the roll mounting (support) brackets 42" at either end of the assembly, to alter the roll's stiffness (thus altering it's "criticals") during operation. The accelerometer 66" includes a lead 68" that passes through the end 40b" of the assembly. This "on-the-fly" tuning of the roll assembly 38" prevents the need to limit the machine's process speed range(s) by dynamically altering the roll's criticals.

Figure 9:
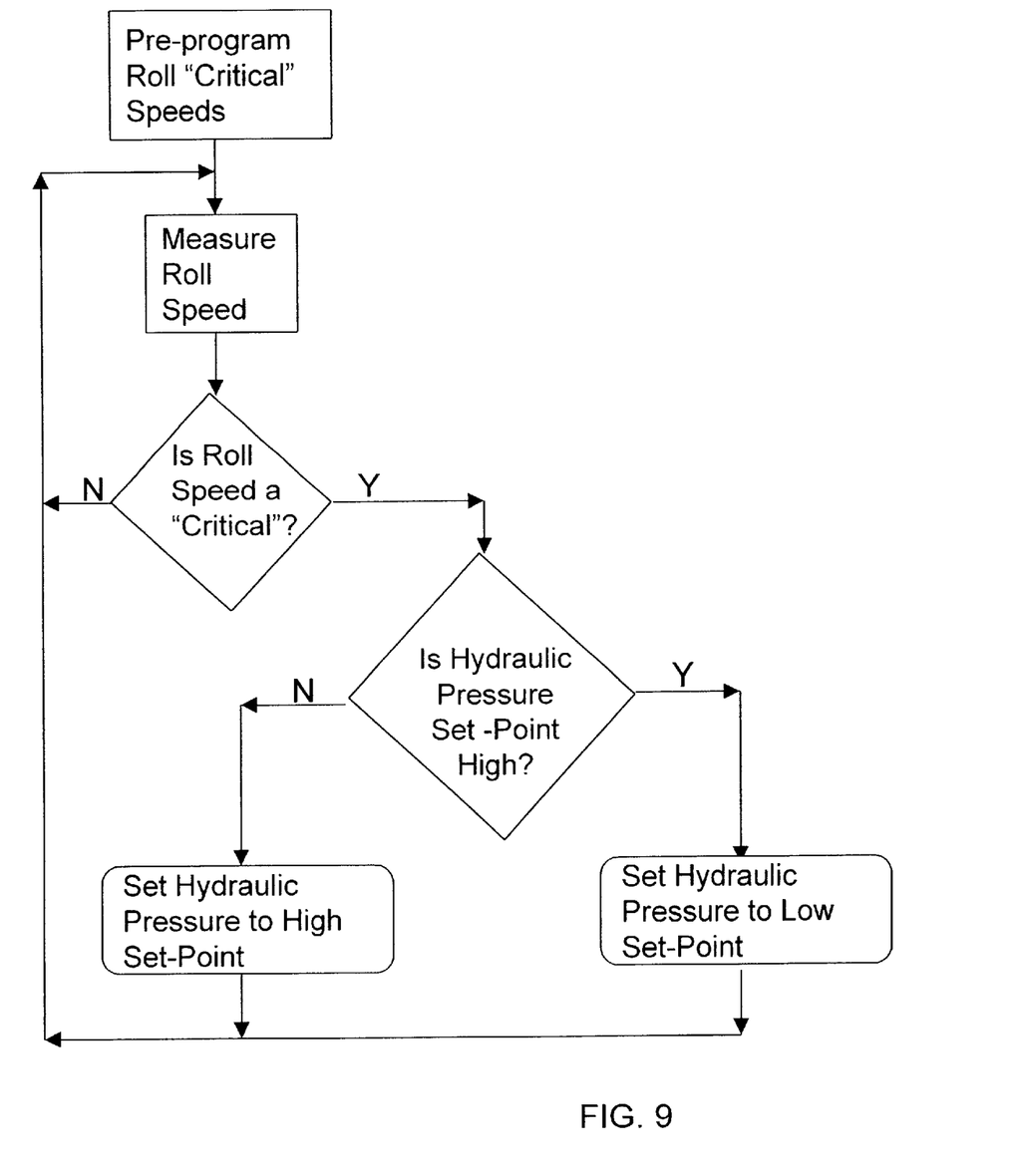
FIG. 9 is a flow diagram showing a system response for altering pre-programmed critical speeds according to an embodiment of a method of the invention.

An embodiment of a method according to the invention to alter pre-programmed critical speeds is illustrated in FIG. 9. According to the method, the critical speeds for the bowed roll 38" are determined by known techniques in the art, as for example, by driving (rotating) the roll assembly 38" at various rotational speeds and recording the specific speeds where excessive vibration or "criticals" are detected. This can be accomplished, for example, by monitoring the output signal strength of the accelerometer 66" or through subjective observation. The criticals are pre-programmed into the PLC 58", and as the roll rotates, the rotational speed is measured, the hydraulic pressure set point (typically about 0 psi to about 1000 psi) of the hydraulic ram 54" is changed when criticals are sensed by the microprocessor based on a machine speed reference signal 64". The PLC in conjunction with the P-I transducer will maintain the hydraulic pressure of the hydraulic ram 54" at the designated set point.

Figure 10:
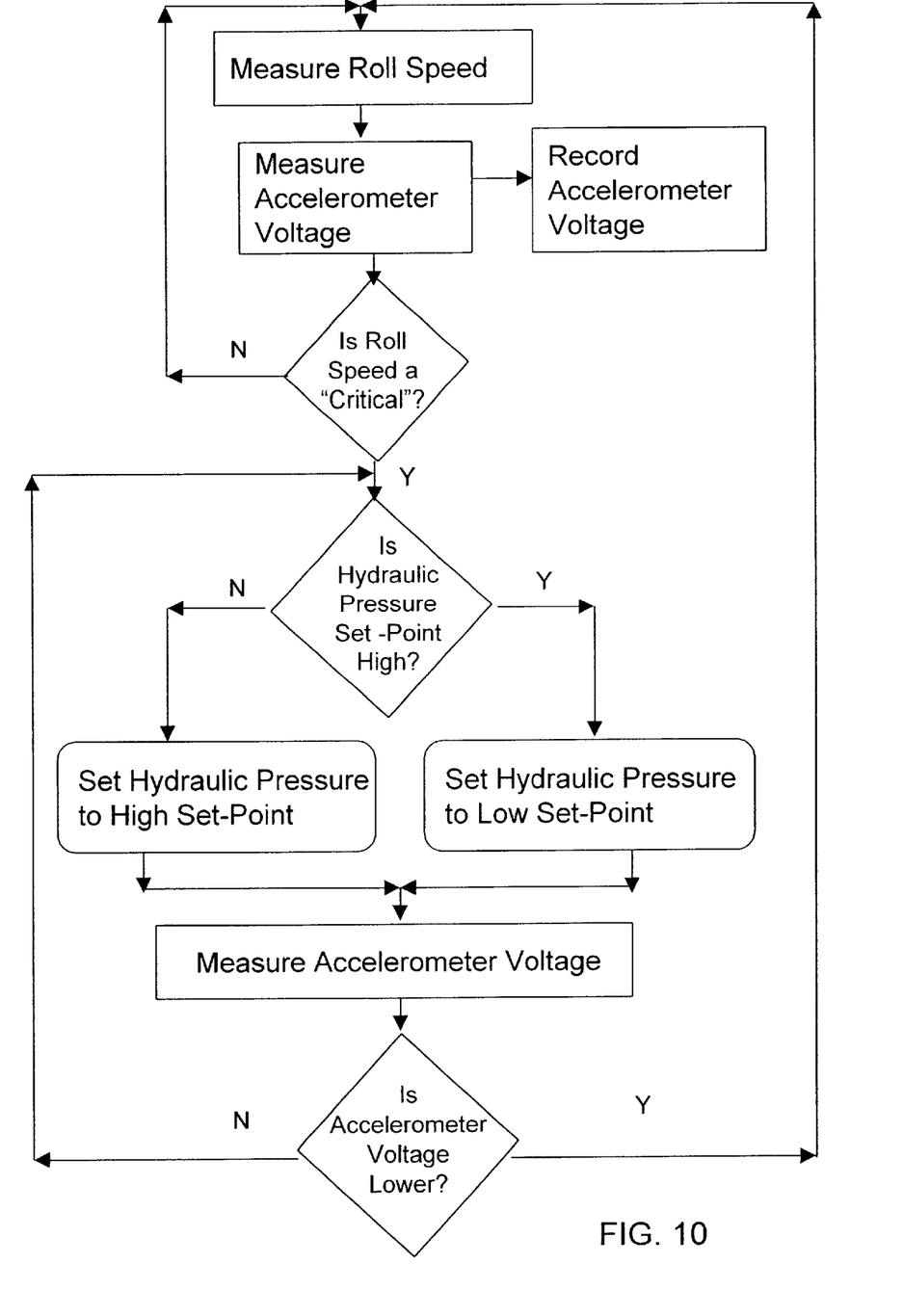
FIG. 10 is a flow diagram showing a system response for detecting and altering critical speeds according to another embodiment of a method of the invention.

Referring to FIG. 10, in another embodiment of a method of the invention, the critical speeds of the bowed roll assembly 38" are again pre-programmed into the PLC 58", the roll rotational speed is measured, and the voltage of the accelerometer 66" at particular rotational speeds is measured and recorded. The microprocessor senses the roll rotational speed and, as the speed approaches the pre-programmed criticals based on the machine speed reference signal, a change can be made to the hydraulic pressure of the hydraulic ram 54' (e.g., increase or decrease the pressure). The change to the critical (or lack thereof) is confirmed during operation by a reading of the voltage output of the accelerometer 66" mounted inside the roll axle 12". The confirmation of the change (increase or decrease) in critical speed is verified by a substantial reduction in the accelerometer signal voltage output.

Figure 11:
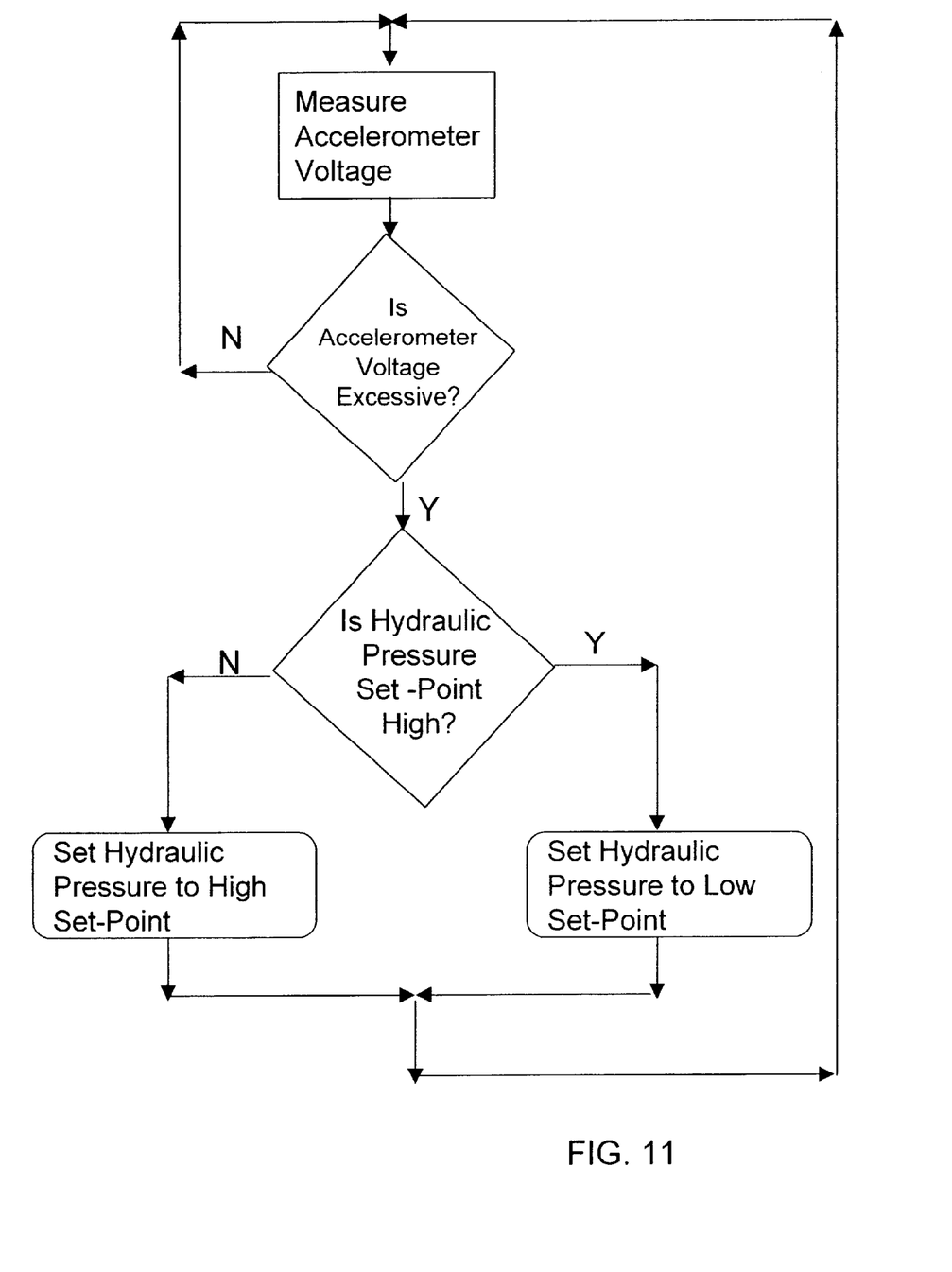
FIG. 11 is a flow diagram showing a system response for altering the critical speeds and verifying the reduction in roll vibration according to another embodiment of a method of the invention.

Referring now to FIG. 11, in yet another embodiment of the method of the invention, the voltage of the accelerometer 66" is measured as an indication of the critical speed of the roll. As the roll's criticals are approached, the criticals are detected by a substantial increase in the signal voltage of the accelerometer 66" mounted inside the roll axle, which triggers the PLC to effect a change to the hydraulic pressure of the hydraulic ram 54", thus altering the critical. As machine speed changes occur during operation, the control system will continually monitor the accelerometer signal voltage and adjust the hydraulic pressure set point to place the criticals outside of the instantaneous process speed.

Figure 12:
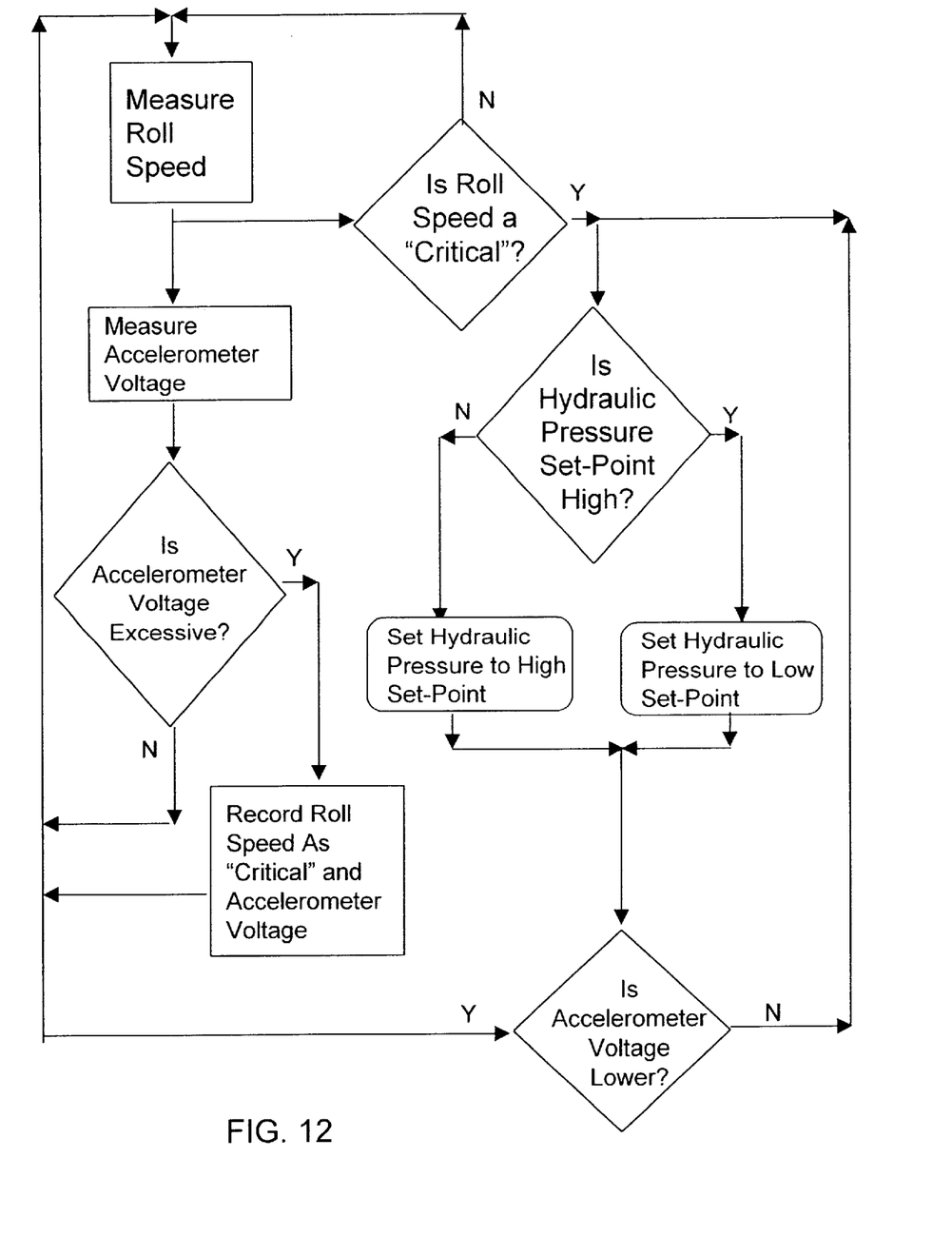
FIG. 12 is a flow diagram showing the system response for detecting, "learning" and altering critical speeds according to another embodiment of a method according to the invention.

Referring to FIG. 12, in a further embodiment of the method of the invention, the roll rotational speed and the voltage of the accelerometer 66" are measured. As the roll's criticals are approached and detected by the accelerometers mounted inside the bowed roll (according to an increase in voltage level), the PLC will record the accelerometer voltage and process rotational speed as a function of the machine speed reference signal, thus "learning" the roll's criticals associated with any given hydraulic pressure set point. Once a "learned" critical is approached, the PLC will trigger a change to the hydraulic pressure set point, thus altering the roll's stiffness and hence the critical. The accelerometers mounted inside the bowed roll can then be used to verify that the critical has indeed been altered by a decrease in voltage level. This technique is commonly referred to as "cascade control" in automatic controls theory.

In another embodiment of each of the foregoing methods, it is desirable to continuously monitor (measure) the pressure of the pressure applying member (e.g., hydraulic ram) against the spacers to verify that the hydraulic pressure is set at the desired level. Thus, each of the foregoing methods can further comprise the steps of continuously monitoring or measuring the pressure of the pressure applying member (e.g., hydraulic ram) against the spacers, and comparing the pressure to a pressure set point, and upon sensing a pressure that is not equal to about the pressure set point, increasing or decreasing the pressure to about the pressure set point.

A bowed roll according to the invention will exhibit substantially no harmonic vibration modes in that, when they are encountered, the "smart" roll will self-adjust. The invention advantageously provides a means to improve the durability, and hence the practical service life of bowed rolls by delaying the failure of the spool bearings as the result of harmonic vibration, which can occur during normal operation. This technology will alleviate the problems of premature spool bearing failures due to harmonic vibration thus avoiding the expense of repair and extensive process machine downtime.

The invention has been described by reference to detailed examples and methodologies. These examples are not meant to limit the scope of the invention. Owing to the observed phenomenon of harmonic vibration, this invention is intended to find application in all bowed rolls, regardless of the specific application. It should be understood that variations and modifications may be made while remaining within the spirit and scope of the invention, and the invention is not to be construed as limited to the specific embodiments shown in the drawings.

What is claimed is:

1. A roll assembly system, comprising:

a non-rotating central axle having a first end and a second end;

at least two tubular segments, each supported on a rolling bearing and rotatably mounted on the central axle; and a plurality of annular spacers mounted on the axle between the roller bearings to maintain the tubular segments in near proximity;

the roll assembly having a stiffness;

the first end of the axle having a member mounted thereon for applying pressure against the bearings and the spacers to compress and uncompress the tubular segments along the axle and alter the stiffness of the roll assembly;

the roll assembly connected to a member for detecting speed of the roll assembly and sending a signal of the speed to a signal processing device;

whereby when the speed of the roll assembly approaches a critical speed, the signal processing device sends a signal to the pressure applying member to vary the pressure against the bearings and spacers to sufficiently stiffen the roll assembly to inhibit harmonic vibration of the roll assembly.

2. A roll assembly, comprising:

a bowed roll assembly comprising at least two rotatable spool assemblies mounted on an axle and held in near proximity by adjacently mounted annular spacers, and a member for applying pressure to the spacers to alter stiffness of the bowed roll assembly, said pressure changing member mounted on the axle;

the roll assembly connected to a member for detecting rotational speed of the roll assembly and sending a signal of the rotational speed to a signal processing device; the signal processing device being programmed with critical speed values of the bowed roll assembly;

whereby when the signal processing device receives a signal of the rotational speed of the bowed roll assembly at or near a critical speed value, the signal processing device sends a signal to the pressure applying member to increase or decrease the pressure against the spacers to sufficiently stiffen or unstiffen the roll assembly to inhibit harmonic vibration of the roll assembly.

3. The roll assembly of claim 2, further comprising: an accelerometer mounted on the roll assembly, the accelerometer having a voltage set value;

whereby during rotation of the roll assembly, an increase in the voltage of the accelerometer relative to the voltage set value indicates the rotational speed of the bowed roll assembly is at or near the critical speed value.

4. The roll assembly of claim 3, whereby during rotation of the roll assembly, a decrease in said accelerometer voltage output relative to the voltage output set value indicates an increase or decrease of the critical speed value.

5. A system for altering stiffness of a bowed roll assembly, comprising:
    a bowed roll assembly comprising at least two spool assemblies mounted on an axle and held in near proximity by adjacently mounted annular spacers;
    a member for applying pressure to compress the spacers and the spool assemblies together to increase the stiffness of the bowed roll assembly, said pressure applying member mounted on an end of the axle proximate to a spacer; and
    a programmable logic controller connected to the bowed roll assembly for receiving signals therefrom, and connected to the pressure applying member for transmitting signals thereto.

6. The system of claim 5, wherein the programmable logic controller is connected to a mechanism for measuring a machine speed reference signal.

7. The system of claim 5, wherein the programmable logic controller comprises a microprocessor that is pre-programmed with critical speeds of the bowed roll assembly.

8. The system of claim 7, wherein the programmable logic controller is functional to alter the pressure set point of the pressure applying member upon sensing a rotational speed at or near a pre-programmed critical speed value.

9. The system of claim 5, wherein the pressure applying member comprises a hydraulic ram.

10. A system for altering stiffness of a bowed roll assembly, comprising:
    a bowed roll assembly comprising at least two spool assemblies mounted on an axle and held in near proximity by adjacently mounted annular spacers;
    a member for applying pressure to compress the spacers and the spool assemblies together to increase the stiffness of the bowed roll assembly, said pressure applying member mounted on an end of the axle proximate to a spacer;
    an accelerometer mounted within the axle of the bowed roll assembly; and
    a programmable logic controller connected to the accelerometer for receiving signals therefrom, and connected to the pressure applying member for transmitting signals thereto.

11. The system of claim 10, wherein the programmable logic controller is connected to a mechanism for measuring a machine speed reference signal.

12. The system of claim 10, wherein the programmable logic controller comprises a microprocessor that is pre-programmed with critical speeds of the bowed roll assembly.

13. The system of claim 10, wherein the voltage output signals of the accelerometer to the programmable logic controller indicate the rotational speed of the assembly, and the programmable logic controller is functional to alter the pressure set point of the pressue applying member upon sensing a rotational speed at or near a pre-programmed critical speed value.

14. The system of claim 10, wherein the pressure applying member comprises a hydraulic ram.

15. A method of altering a critical speed of a bowed roll assembly, the bowed roll assembly comprising at least two spool assemblies mounted on an axle and held in near proximity by adjacently mounted annular spacers, and a member for applying pressure against the spacers to alter stiffness of the bowed roll assembly, the pressure applying member having a pressure set point; the method comprising the steps of:
    pre-programming critical speeds of the bowed roll assembly into a programmable logic controller;
    measuring rotational speed of the roll assembly;
    determining whether the rotational speed of the roll assembly is a critical speed; and
    wherein, during operation of the bowed roll assembly, when the rotational speed is at or about a critical speed, altering pressure of the pressure applying member against the spacers to increase or decrease the stiffness of the roll to alter the critical speed to a range outside of the roll rotational speed.

16. The method of claim 15, further comprising, prior to the step of pre-programming the critical speeds, the step of determining the critical speeds of the bowed roll assembly.

17. The method of claim 16, wherein the step of determining the critical speeds comprises operating the roll assembly at a plurality of rotational speeds and recording the speeds at which the critical speeds occur.

18. The method of claim 17, wherein the step of determining the critical speeds comprises observing vibration of the roll assembly.

19. The method of claim 17, wherein the roll assembly further comprises an accelerometer having an output signal, and the step of determining the critical speeds comprises measuring the output signal of the accelerometer.

20. The method of claim 15, wherein the steps of determining whether the rotational speed is a critical speed comprises comparing the rotational speed to the pre-programmed critical speed.

21. The method of claim 15, wherein the pressure applying member comprises a hydraulic ram.

22. A method of altering a critical speed of a bowed roll assembly, the bowed roll assembly comprising at least two spool assemblies mounted on an axle and held in near proximity by adjacently mounted annular spacers, and a member for applying pressure against the spacers to alter stiffness of the bowed roll assembly; the method comprising the steps of:
    measuring rotational speed of the bowed roll assembly;
    comparing the rotational speed to a pre-programmed critical speed value;
    altering the pressure of the pressure applying member against the spacers upon sensing the rotational speed at or about the pre-programmed critical speed to increase or decrease the stiffness of the bowed roll assembly and alter the critical speed to a range outside of the roll rotational speed.

23. The method of claim 22, further comprising:
    continuously measuring the pressure of the pressure applying member against the spacers, and comparing the pressure to a pressure set point; and
    upon sensing a pressure not equal to about the pressure set point, increasing or decreasing the pressure to about the pressure set point.

24. The method of claim 22, wherein the bowed roll assembly further comprises an accelerometer mounted on the roll assembly; and the method further comprises:
    after the step of measuring the rotational speed of the roll assembly, the steps of:

measuring the output voltage of the accelerometer; and
recording the output voltage of the accelerometer;

wherein, the step of determining whether the rotational speed is about a critical speed comprises measuring the voltage output of the accelerometer wherein an increase of voltage over a voltage set point indicates a rotational speed at or about a critical speed; and when the rotational speed is at or about a critical speed, altering pressure of the pressure applying member against the spacers to increase or decrease the stiffness of the roll to alter the critical speed to a range outside of the roll rotational speed.

25. The method of claim 24, further comprising, after the step of altering the pressure of the pressure applying member, the step of measuring the voltage output of the accelerometer to determine whether the critical speed has been altered, wherein a decrease in the accelerometer voltage indicates an increase or decrease in the critical speed outside the range of the rotational speed of the roll assembly.

26. A method of altering a critical speed of a bowed roll assembly, the bowed roll assembly comprising at least two spool assemblies mounted on an axle and held in near proximity by adjacently mounted annular spacers, a member for applying pressure against the spacers to alter stiffness of the bowed roll assembly, the pressure applying member having a pressure set-point, and an accelerometer mounted on the roll assembly; the method comprising the steps of:

measuring rotational speed of the roll assembly;

measuring voltage output of the accelerometer; and determining whether the rotational speed of the roll assembly is at or about a critical speed based on the voltage output of the accelerometer compared to a voltage output set-point;

wherein, when the rotational speed is at or about a critical speed, altering pressure of the pressure applying member against the spacers to increase or decrease the stiffness of the roll to alter the critical speed to a range outside of the roll rotational speed.

27. The method of claim 26, further comprising, after the step of measuring the voltage output of the accelerometer, the step of recording the voltage of the accelerometer.

28. The method of claim 26, further comprising, after the step of altering the pressure of the pressure applying member, the step of measuring the voltage output of the accelerometer to determine whether the critical speed has been altered to a range outside of the roll rotational speed.

29. The method of claim 28, wherein a decrease in voltage output below the set value indicates a change in the critical speed.

30. The method of claim 26, further comprising:

continuously measuring the pressure applying member against the spacers, and comparing the pressure to a pressure set point; and upon sensing a pressure not equal to about the pressure set point, increasing or decreasing the pressure to about the pressure set point.

31. A method of altering a critical speed of a bowed roll assembly, the bowed roll assembly comprising at least two spool assemblies mounted on an axle and held in near proximity by adjacently mounted annular spacers, a member for applying pressure against the spacers to alter stiffness of the bowed roll assembly, and an accelerometer mounted on the roll assembly; the method comprising the steps of:

measuring rotational speed of the bowed roll assembly;

measuring voltage output of the accelerometer to determine whether the rotational speed is at or about a critical speed value;

upon sensing the rotational speed at or about the critical speed value, increasing or decreasing the pressure of the pressure applying member against the spacers to alter the critical speed value to a range outside of the roll rotational speed; and measuring the voltage output of the accelerometer to confirm the alteration of the critical speed value, wherein a decrease in the accelerometer signal voltage indicates an increase or decrease in the critical speed value.

32. A method of altering a critical speed of a bowed roll assembly, the bowed roll assembly comprising at least two spool assemblies mounted on an axle and held in near proximity by adjacently mounted annular spacers, a member for loading against the spacers by applying pressure to alter stiffness of the bowed roll assembly, and an accelerometer mounted on the roll assembly, the method comprising the steps of:

measuring voltage output of the accelerometer; and determining if the accelerometer voltage output exceeds a set value;

wherein if the accelerometer voltage output is higher than the set value, altering the pressure of the pressure applying member against the spacers to increase or decrease the stiffness of the roll to alter the critical speed to a range outside of the rotational speed of the roll.

33. A method of altering a critical speed of a bowed roll assembly, the bowed roll assembly comprising at least two spool assemblies mounted on an axle and held in near proximity by adjacently mounted annular spacers, a member for applying pressure against the spacers to alter stiffness of the bowed roll assembly, and an accelerometer mounted on the roll assembly, the method comprising the steps of:

measuring voltage output of the accelerometer to determine whether the rotational speed is at or about a critical speed value, wherein an accelerometer signal voltage higher than a set voltage output value indicates the rotational speed to be at or about the critical speed; and upon sensing the rotational speed at or about the critical speed, increasing or decreasing the pressure against the spacers to alter the critical speed value to a range outside of the rotational speed of the roll.

34. The method of claim 33, further comprising:

continuously measuring the pressure of the pressure applying member against the spacers, and comparing the pressure to a pressure set point; and upon sensing a pressure not equal to about the pressure set point, increasing or decreasing the pressure to about the pressure set point.

35. The method of claim 33, further comprising, after the step of increasing or decreasing the pressure, measuring the voltage output of the accelerometer to confirm that the critical speed value is within a range outside that of the rotational speed of the roll assembly.

36. A method of altering a critical speed of a bowed roll assembly, the bowed roll assembly comprising at least two spool assemblies mounted on an axle and held in near proximity by adjacently mounted annular spacers, a member for applying pressure against the spacers to alter stiffness of the bowed roll assembly, an accelerometer mounted on the roll assembly, and a programmable logic controller; the method comprising the steps of:

measuring rotational speed of the roll assembly;

measuring voltage output of the accelerometer;

determining if the voltage output of the accelerometer exceeds a set value whereby the rotational speed is at or about a critical speed value;

when the accelerometer voltage output exceeds the set value, recording the voltage output and the rotational speed by the programmable logic controller as a value to indicate a critical speed;

when the rotational speed is at or about a critical speed, altering pressure of the pressure applying member against the spacers to alter the critical speed to a range outside of the rotational speed of the roll; and measuring the voltage output of the accelerometer and the rotational speed of the roll whereupon, when said voltage output and rotational speed are at the recorded critical speed value recorded by the programmable logic controller, altering the pressure of the pressure applying member to alter the critical speed outside the range of the rotational speed of the roll.

37. A method of altering a critical speed of a bowed roll assembly, the bowed roll assembly comprising at least two spool assemblies mounted on an axle and held in near proximity by adjacently mounted annular spacers, a member for applying pressure against the spacers to alter stiffness of the bowed roll assembly, and an accelerometer mounted on the roll assembly, the method comprising the steps of:

measuring rotational speed of the bowed roll assembly;

measuring voltage of the accelerometer to determine whether the rotational speed is at or about a critical speed value, wherein an accelerometer signal voltage at about a set value indicates the critical speed;

if a critical speed is indicated, recording the accelerometer voltage and the rotational speed of the roll assembly as a critical speed value;

wherein, upon sensing said recorded critical speed value, increasing or decreasing the pressure against the spacers by the pressure applying member to alter the stiffness of the bowed roll and the critical speed to a range outside of the roll rotational speed.

38. The method of claim 37, further comprising after the step of increasing or decreasing the pressure of the pressure applying member, the step of:

measuring the voltage output of the accelerometer to verify the increase or decrease to the critical speed, whereby a decrease in the voltage output indicates an increase or decrease of the critical speed value.

39. The method of claim 37, further comprising:

continuously measuring the pressure of the pressure applying member against the spacers, and comparing the pressure to a pressure set point; and upon sensing a pressure not equal to about the pressure set point, increasing the pressure to about the pressure set point.

40. A method of altering a critical speed of a bowed roll assembly, the bowed roll assembly comprising at least two spool assemblies mounted on an axle and held in near proximity by adjacently mounted annular spacers, a member for applying pressure against the spacers to alter stiffness of the bowed roll assembly, and an accelerometer mounted on the roll assembly, the method comprising the steps of:

measuring rotational speed of the roll assembly;

measuring the voltage output of the accelerometer; wherein if the accelerometer voltage output is higher than a set voltage output value, recording the rotational speed of the roll assembly as critical and recording the accelerometer voltage output at said rotational speed; and determining pressure of the pressure applying member against the spacers and recording said pressure;

altering the pressure of the pressure applying member to alter the stiffness of the bowed roll and the critical speed to a range outside of the roll rotational speed;

measuring the voltage output of the accelerometer to verify the alteration to the critical speed; and measuring the accelerometer voltage output wherein upon sensing the recorded rotational speed and voltage output, altering the pressure of the pressure applying member to alter the stiffness of the bowed roll to alter the critical speed to a range outside of the roll rotational speed.

* * * * *